United States Patent
Byrd et al.

(10) Patent No.: US 6,660,065 B2
(45) Date of Patent: Dec. 9, 2003

(54) PRESSURE SWING ADSORPTION DRYER FOR PNEUMATICALLY DRIVEN PRESSURE INTENSIFIERS

(75) Inventors: Gary N. Byrd, Donahue, IA (US); Timothy C. Phillis, Rock Island, IL (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/138,525

(22) Filed: May 6, 2002

(65) Prior Publication Data

US 2003/0205141 A1 Nov. 6, 2003

(51) Int. Cl.[7] .......................... B01D 53/04; B01D 53/26
(52) U.S. Cl. .......................... 95/117; 95/122; 95/130; 96/130; 96/133; 96/143
(58) Field of Search .......................... 95/117–119, 121, 95/122, 130; 96/130–133, 143, 149, 137

(56) References Cited

U.S. PATENT DOCUMENTS

| | | | | |
|---|---|---|---|---|
| 3,923,477 A | * | 12/1975 | Armond et al. | 95/103 |
| 3,957,463 A | * | 5/1976 | Drissel et al. | 95/103 |
| 4,222,750 A | * | 9/1980 | Gauthier et al. | 95/102 |
| 4,331,455 A | * | 5/1982 | Sato | 95/21 |
| 4,439,213 A | * | 3/1984 | Frey et al. | 95/98 |
| 4,636,226 A | * | 1/1987 | Canfora | 95/138 |
| 4,673,415 A | * | 6/1987 | Stanford | 95/19 |
| 5,071,453 A | | 12/1991 | Hradek et al. | 55/21 |
| 5,110,327 A | * | 5/1992 | Smith | 96/113 |
| 5,112,367 A | * | 5/1992 | Hill | 95/98 |
| 5,183,483 A | * | 2/1993 | Servido et al. | 95/98 |
| 5,234,479 A | * | 8/1993 | Henderson et al. | 95/105 |
| 5,275,642 A | * | 1/1994 | Bassine | 96/149 |
| 5,354,361 A | | 10/1994 | Coffield | 95/103 |
| 5,549,736 A | | 8/1996 | Coffield et al. | 96/133 |
| 5,795,370 A | * | 8/1998 | Garrett et al. | 96/130 |
| 5,858,062 A | | 1/1999 | McCulloh et al. | 95/8 |
| 5,908,053 A | | 6/1999 | Byrd | 141/18 |
| D412,577 S | | 8/1999 | Mickelson et al. | D24/164 |
| 6,319,303 B1 | * | 11/2001 | Guillard et al. | 95/97 |
| 6,342,090 B1 | * | 1/2002 | Cao | 95/23 |
| 6,358,300 B1 | * | 3/2002 | Fornof et al. | 95/91 |
| 6,425,935 B1 | * | 7/2002 | Amato et al. | 95/1 |
| 6,475,265 B1 | * | 11/2002 | Baksh et al. | 95/96 |
| 6,478,850 B1 | * | 11/2002 | Warren | 95/21 |

* cited by examiner

Primary Examiner—Robert H. Spitzer
(74) Attorney, Agent, or Firm—Lowe Hauptman Gilman & Berner, LLP

(57) ABSTRACT

The present invention includes two beds of activated alumina or similar material, which can remove moisture during a PSA cycle. One bed is placed in series in each drive air line for the pressure intensifier or boost pump. The beds are sized such that there is sufficient material to adsorb the moisture contained in the volume of gas required to move the drive piston through a complete stroke.

18 Claims, 5 Drawing Sheets

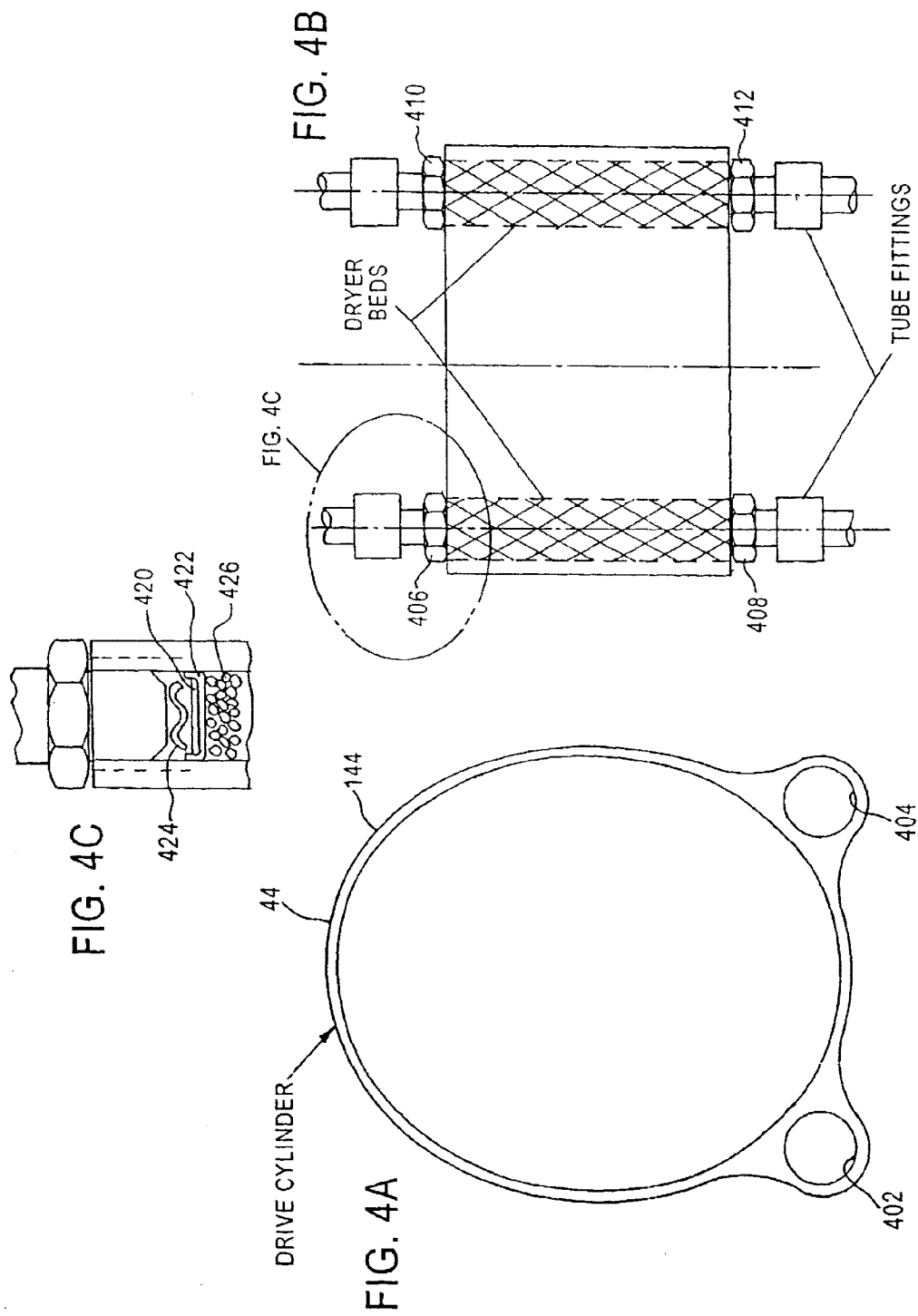

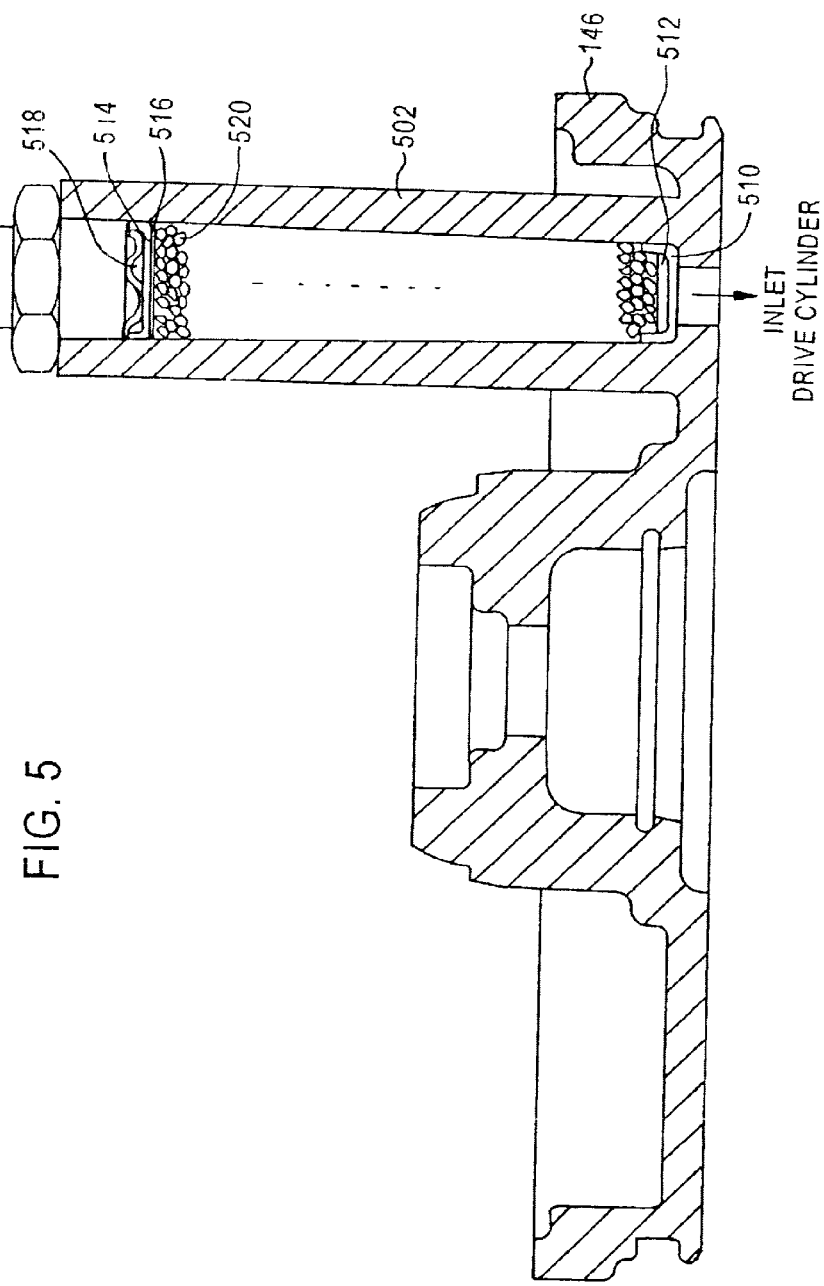

PRESSURE SWING ADSORPTION DRYER FOR PNEUMATICALLY DRIVEN PRESSURE INTENSIFIERS

BACKGROUND OF THE INVENTION

1. Field of the Invention

The present invention relates generally to a pressure swing adsorption dryer for a pneumatically driven pressure intensifier. More specifically, the present invention relates to a pressure intensifier used in a pressure swing adsorption system. The present invention also relates to a kit for retrofitting existing pneumatically driven pressure intensifiers.

2. Description of the Related Art

The use of concentrators of the pressure swing adsorber type to produce an enriched product gas is well known. Pressurized air is cyclically delivered to a plurality of beds of molecular sieve material and certain components of the air become adsorbed by the sieve while the chosen component passes through. The beds are sequentially vented to atmosphere and purged with product gas to discharge the adsorbed components from the molecular sieve, and in this manner, a continuous flow of enriched product gas can be generated.

In certain situations, the required pressure of the product gas is higher than the output pressure from the adsorber and a pressure booster may be used to increase the pressure of the product gas in order to meet system requirements. Booster compressors themselves are old in the art and may take several forms. Some are electrically driven but in certain situations a pneumatically driven booster provides advantages. The pneumatic booster may be driven in sync with the beds of the pressure swing adsorber and such a system is shown in U.S. Pat. No. 5,071,453 assigned to the assignee of the instant invention.

The pneumatically driven pressure intensifier utilizes low pressure drive air acting on a large piston to shuttle smaller pistons which in turn compress product gas to an elevated pressure. In addition, in some cases, the compressor size can be minimized by using air conservation techniques as described in U.S. Pat. No. 5,354,361, the disclosure of which is hereby incorporated by reference into the present specification in its entirety. The drive gas is separated from the product gas through a series of shaft and piston seals, which allow the pistons and drive shaft to move while providing pneumatic integrity. The drive air used to shuttle the pistons contains water vapor which can condense in the drive cylinder. The presence of water in the drive cylinder can have serious detrimental effects on the performance of the pressure intensifier.

SUMMARY OF THE INVENTION

It is an object of the present invention to provide a drying apparatus for use with a pressure intensifier for drying drive gas before the drive gas enters the pressure intensifier.

It is another object of the present invention to provide two activated beds and one or more valves between a pressurized air source and a pressure intensifier for drying drive gas before it enters the pressure intensifier.

Another object of the present invention is to provide a retrofit kit for retrofitting existing pressure swing adsorption systems with a drying apparatus for drying drive gas before the drive gas enters the pressure intensifier.

It is still another object of the present invention to provide a pressure swing adsorber and a pneumatically driven booster in which the timing of the valves which control the operation of the concentrator and the booster, and the plumbing between the concentrator and the booster are selected to control the timing of the transfer of gases which are admitted to the sieve beds.

These and other objects of the present invention are achieved by a drying apparatus for a pressure swing adsorption system including a pair of beds having molecular sieve material with each bed having an inlet and an outlet. A pressure intensifier increases the pressure of enriched product gas. The pressure intensifier includes a pneumatic drive cylinder which has opposed sides which are alternatively pressurized in order to drive the pressure intensifier. The pair of beds and the pneumatic drive cylinder are coupled to a source of compressed feed air. The drying apparatus includes a pair of moisture removing beds each connected to the source of compressed feed air. At least one valve is located between the source of compressed feed air and the pair of moisture removing beds. The pressure intensifier is alternatively pressurized with feed air via the pair of moisture removing beds.

The foregoing and other objects of the present invention are achieved by a method of drying gas used in a pneumatically driven pressure intensifier. The pressure intensifier is used in a pressure swing adsorption system. The pressure swing adsorption system includes a pair of molecular sieve beds each connected to a first and a second valve, respectively. The first and the second valves are each connected to a source of pressurized gas and an ambient vent line. The method comprises flowing pressurized gas to opposite sides of the pressure intensifier drive cylinder to position the pressure intensifier drive piston. Pressurized gas flows through a first activated bed to dry the gas and to pressurize one side of the pressure intensifier drive cylinder to shift the pressure intensifier to a first position. Gas is vented from the other side of the pressure intensifier drive cylinder through a second activated bed which desorbs moisture from the second bed. During the second stage of the pressure intensifier cycle, the side of the drive cylinder which was originally pressurized is vented to ambient through the first activated bed which desorbs moisture from the bed. Simultaneously, the other side of the drive cylinder is pressurized through the second activated bed. The second activated bed dries the gas entering the drive cylinder and shuttles the pressure intensifier piston to the other side.

The foregoing and other objects of the present invention are achieved by a drying kit for retrofitting a pressure intensifier used in a pressure swing adsorption system. The pressure intensifier has a first side and a second side. The pressure swing adsorption system has a pair of molecular sieve beds and a first valve connected to a source of pressurized gas and to one of the pair of molecular sieve beds and a second valve connected to the source of pressurized gas and to the other of the pair of molecular sieve beds. The drying kit includes a first activated bed connectable to the source of pressurized gas and to the first side of the pressure intensifier and a second activated bed connectable to the source of pressurized gas and to the second side of the pressure intensifier. At least one valve is provided to selectively connect said first activated bed to the source of pressurized gas and to selectively connect the second activated bed to the source of pressurized gas.

The foregoing and other objects of the present invention are achieved by a pressure swing adsorption system having a pressure intensifier including a drying apparatus. The pressure swing adsorption system includes a pair of beds having molecular sieve material each having an inlet and an outlet. A pneumatic drive cylinder has opposed sides which are alternatively pressurized in order to drive the pressure intensifier. The pair of beds are coupled to a source of compressed feed air. The pair of moisture removing beds are each connected to the source of compressed feed air. The pressure intensifier is alternatively pressurized with feed air via the pair of moisture removing beds. At least one valve is located between the source of compressed feed air and the pair of moisture removing beds.

The present invention provides a method and apparatus for drying drive gas before it enters the drive cylinder. The present invention includes two beds of activated alumina or similar material, which can remove moisture during a PSA cycle. One bed is placed in series in each drive gas line for the pressure intensifier or boost pump. The beds are sized such that there is sufficient material to adsorb the moisture contained in the volume of gas required to move the drive piston through a complete stroke. During operation as one side of the cylinder is pressurized the gas entering the cylinder is dried by the activated alumina bed. The gas from the other side of the piston is vented back to ambient through the other bed which regenerates the activated alumina in that bed due to the desorption caused by the drop in pressure. The present invention is usable as a drying apparatus for a pressure intensifier in a pneumatic circuit for a conventional PSA system. The present invention is also usable as a drying apparatus for a pressure intensifier in a pneumatic circuit for a system utilizing the gas conservation scheme described in U.S. Pat. No. 5,354,361. Advantageously, activated beds can be incorporated into the drive cylinder body or the drive caps to eliminate extra components and minimize weight and size. The present invention can also be provided as a kit to retrofit a drying apparatus to an existing pressure swing adsorption system having a pressure intensifier.

It is still another object of the present invention to provide a pressure swing adsorber and a pneumatically driven booster in which the timing of the valves which control the operation of the concentrator and the booster, and the plumbing between the concentrator and the booster are selected to control the timing of the transfer of gases which are admitted to the sieve beds.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 4A–4C are illustrations of dryer beds incorporated into the drive cylinder; and FIG. 5 is a pressure intensifier drive cylinder head with integral dryer on each cap.

DETAILED DESCRIPTION

Figure 1:
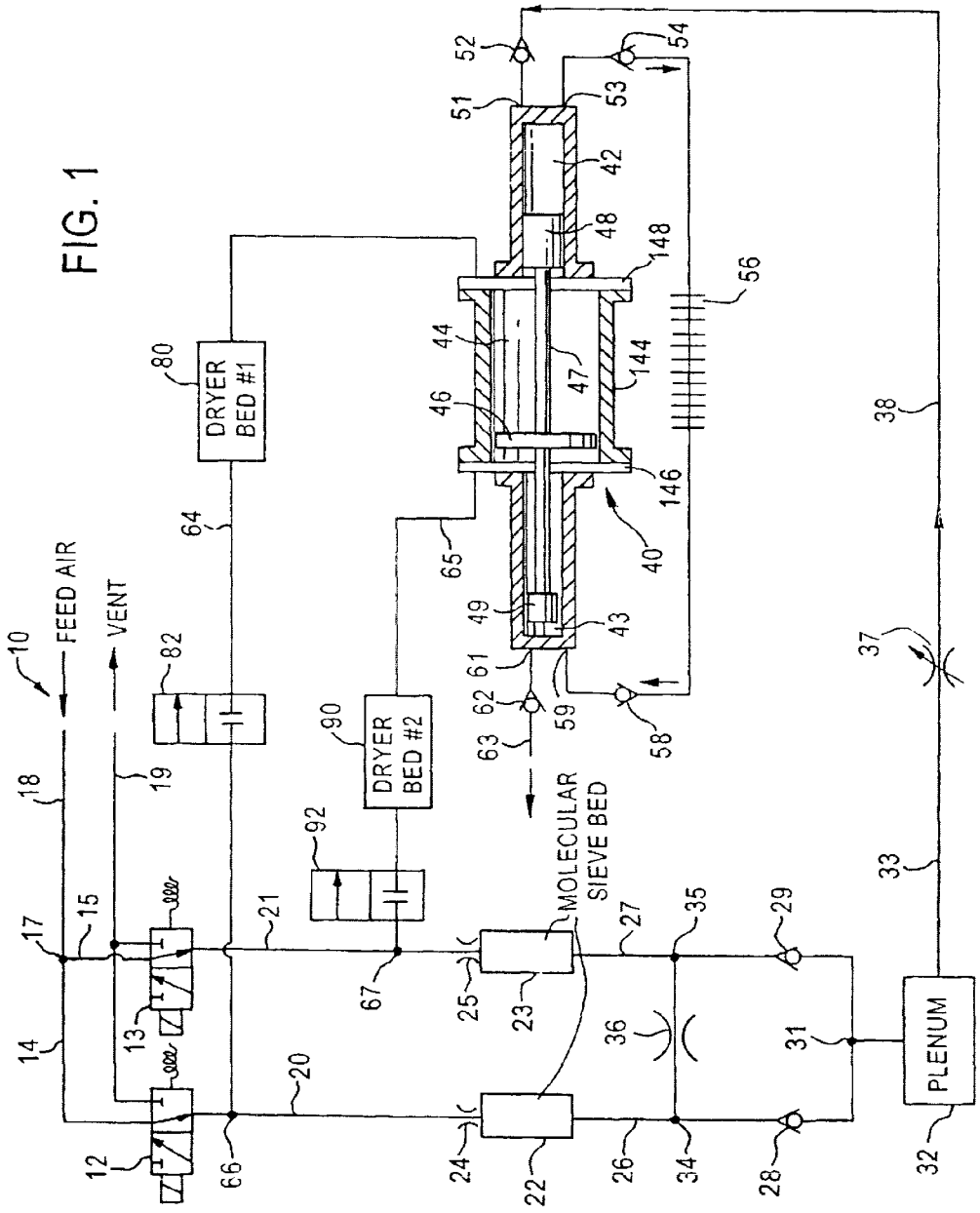
FIG. 1 is a schematic view of a combination pressure swing adsorber using air conservation techniques and booster compressor using the drying apparatus according to an embodiment of the present invention with the valves shown in a de-energized position.

FIG. 1 depicts a combination of a pressure swing adsorber or concentrator and a pressure intensifier or boost pump generally designated by the reference numeral 10. It should be understood that terms such as "left" and "right" are used for purposes of explanation only. Example concentrators usable with the present invention are described in U.S. Pat. No. 5,858,062, entitled "Oxygen Concentrator", issued Jan. 12, 1999 and U.S. Pat. No. 5,549,736, entitled "Modular Stackable Pressure Swing Adsorption Concentrator", issued Aug. 27, 1996, both of which are hereby incorporated by reference in their entirety into the present specification. The concentrator comprises a pair of three-way solenoid valves 12 and 13 which are coupled by inlet lines 14 and 15 respectively to a common node 17. The node 17 is coupled to a feed air inlet 18 which receives air from a compressor. The outlets of the valves 12 and 13 are coupled to inlet lines 20 and 21, respectively, for the sieve beds 22 and 23. Each sieve bed 22 and 23 can have an inlet restriction 24 and 25 located immediately adjacent the inlet to the bed although not necessary. The outlets 26 and 27 of the sieve beds 22 and 23 are coupled to nodes 34 and 35 which are coupled to check valves 28 and 29 and to one another through a restrictor 36. The outlets of the check valves 28 and 29 are coupled to a node 31 which is coupled on the side of the pressure intensifier.

The pressure booster 40 comprises a first stage compression cylinder 42, a second stage compression cylinder 43 and a driving cylinder 44. A driving piston 46 is positioned in the driving cylinder 44 and reciprocates to either end thereof. The driving piston 46 is connected to a drive shaft 47 having a first stage piston 48 at one end and a second stage piston 49 at the other end. Product gas from the concentrator outlet line 38 is coupled to the inlet 51 of the first stage cylinder 42 through a check valve 52, control valve 37, line 33 and plenum 32. The outlet 53 of the first stage cylinder is coupled through a check valve 54 to an intercooler 56. The intercooler is coupled through a second check valve 58 to the inlet 59 of the second stage compression cylinder 43. The outlet 61 of the second stage cylinder 43 is coupled through a check valve 62 to an outlet conduit 63 which is coupled to the point of use (not shown) of the compressed product gas.

Gas which is used to drive the driving piston 46 is supplied to either side of the driving cylinder 44 by the two inlet lines 64 and 65. The inlet lines 64 and 65 are coupled to the outlets of the three-way solenoid valves 12 and 13 at nodes 66 and 67, respectively, and thus receive air from the feed air inlet 18 in a timed sequence which is controlled by the valves 12 and 13.

The drying apparatus according to the present invention is advantageously placed in inlet lines 64 and 65 as depicted in FIG. 1. Advantageously, the present invention can either be retrofitted to an existing pressure swing adsorption system or can be used in a new pressure swing adsorption system. As depicted schematically in FIG. 1, a first dryer bed 80 is inserted in the inlet line 64 upstream from a two-way valve 82. Similarly, a second dryer bed 90 is inserted in the inlet line 65 upstream from a two-way valve 92. The two-way valves 82 and 92 are open when the pressure intensifier is operating and closed when it is not operating. The dryer beds 80, 90 include a drying material such as an activated alumina or other similar material for removing moisture from the source of feed air.

Figure 2:
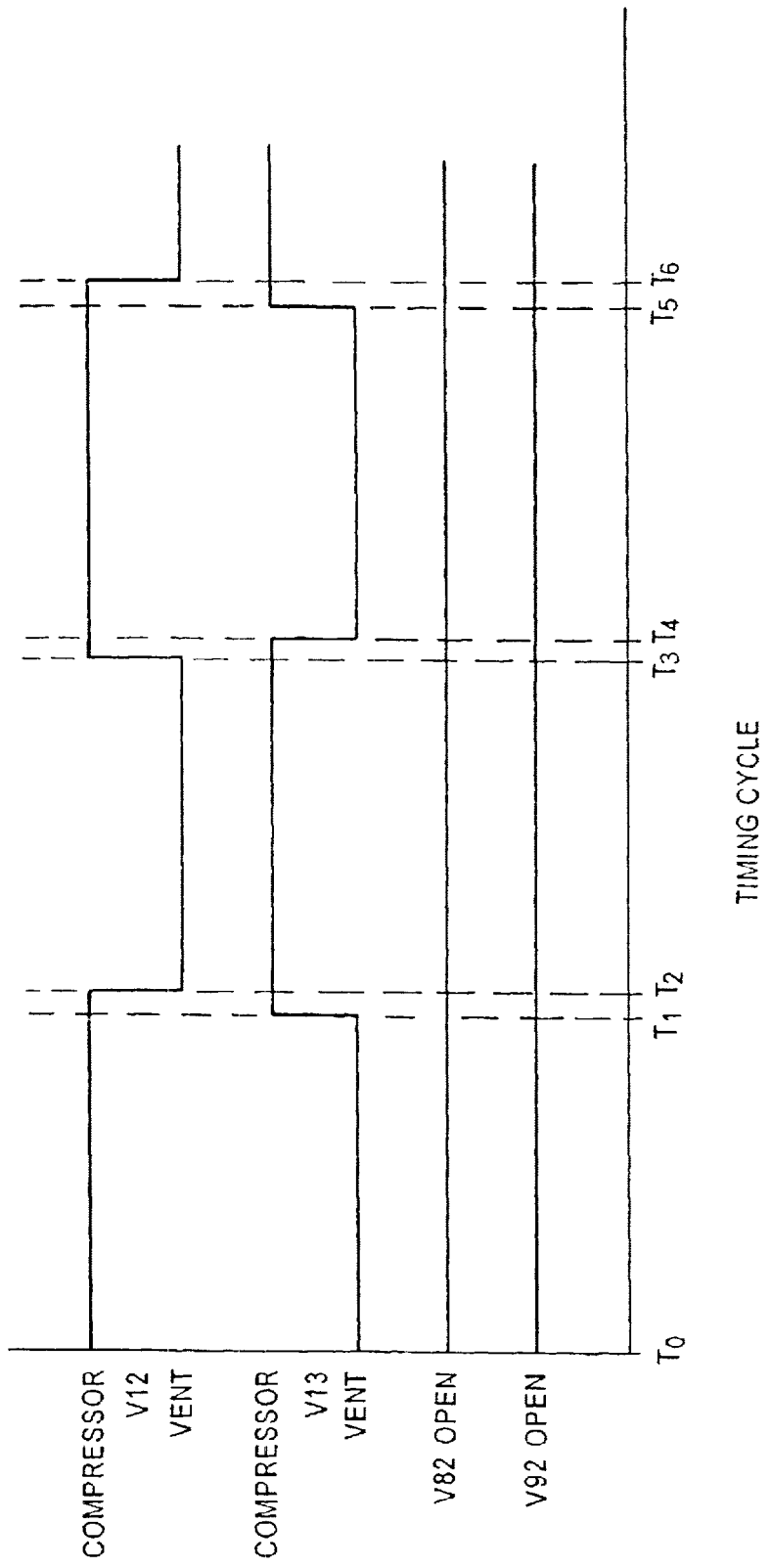
FIG. 2 is a graph showing the timing of the valves used to control the pressure swing adsorber and the booster compressor.

FIG. 2 shows the timing sequence for solenoid valve 12, valve 13, valve 82 and valve 92 for a PSA system utilizing the energy conservation techniques described in U.S. Pat. No. 5,354,361. As shown, valve 82 and valve 92 are open while the pressure intensifier 44 is operating. At time $T_0$, valve 12 is open to the compressed air line 18 and valve 13 is venting to ambient through the vent line 19. At time $T_1$, valve 13 switches to the compressed air line 18 which allows bed 23 which is at very low pressure to be pressurized by the compressor and the gas contained in bed 22, dryer 80 and the right hand side of the drive cylinder 44. At time $T_2$, valve 12 switches to the vent line 19 which completes venting of bed 22, dryer 80 and the right hand side of the drive air cylinder 44. Valve 13 remains switched to the compressed air line 18. At time $T_3$ valve 12 switches the compressed air line 18 which allows bed 22 which is at a very low pressure to be pressurized by the compressor and the gas from bed 23, dryer 90 and the left hand side of the drive cylinder 44. At time $T_4$, valve 13 switches to the vent line 19 which completes venting of bed 23 dryer bed 90 and the left hand side of the drive cylinder 44. At time $T_5$, valve 13 switches back to the. compressed air line and at time $T_6$, valve 12 switches to again be open to the compressed air line 18.

At the beginning of a typical pneumatic cycle with the pressure intensifier operating, valve 12 is open to the compressed air inlet 18, bed 22, dryer bed 80 and the right side of the intensifier 44 are pressurized. Valve 13 is open to the vent line 19 and bed 23, dryer bed 90 and the left side the drive cylinder 44 are vented to atmosphere through the vent line 19. In the next step of the cycle valve 13 switches to the compressed air line. This allows the high pressure gas from bed 22, dryer bed 80 and the right side of the pressure intensifier 44 to flow into bed 23 which is at a low pressure through valve 12 in addition to the compressed feed air which flows through valve 13. At the end of this period, valve 12 switches to the vent line 19 allowing bed 22, dryer bed 80 and the right side of the pressure intensifier to vent to atmosphere. At this time valve 13 remains open to the feed air line allowing bed 23, dryer bed 90 and the left side of the pressure intensifier 44 to continue to pressurize. In the last step of the pneumatic cycle valves 12 and 13 are both switched to the compressed air feed line 18. This allows the high pressure gas from bed 23, dryer bed 90 and the left side of the pressure intensifier to flow into bed 22 which is at a low pressure through valve 13 in addition to the feed air which flows through valve 12. This cycle is repeated allowing both the molecular sieve beds and the dryer beds to adsorb and desorb the unwanted components from the gas stream in a regenerative process.

Figure 3:
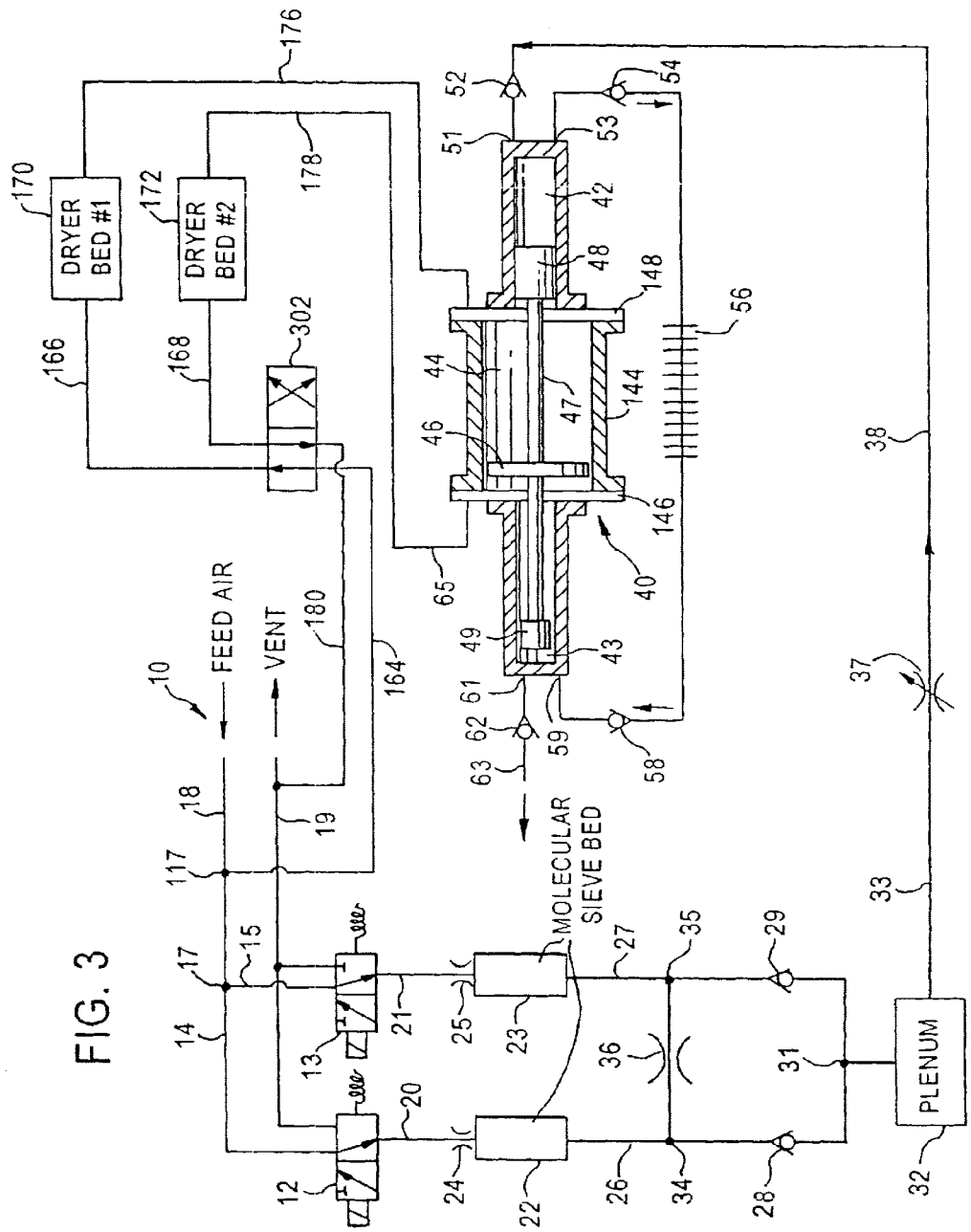
FIG. 3 is a schematic view of a combination pressure swing adsorber and booster compressor using the drying apparatus in accordance with an embodiment of the present invention.

FIG. 3 is similar to FIG. 1 except that line 164 is connected directly to the feed air line at node 117 which is upstream from the valve 12. A four-way valve 302 is positioned in line 164 and is connected to the first dryer bed 170. A line 166 connects the four-way valve 302 to the first dryer bed 170. A line 168 connects the four-way valve 302 to the second dryer bed 172. In turn, the first dryer bed 170 is connected to the right side of the drive cylinder 44 by a line 176 and the second dryer bed 172 is connected to the left side of the drive cylinder 44 by a line 178. The operation of the second embodiment in FIG. 3 is similar to the FIG. 1 embodiment except that the four-way valve 302 does the switching rather than the two-way valves. In this system operation of the pressure intensifier 44 is independent of the timing cycle of the beds 22, 23. The gas in the drive cylinder 44 and dryer beds 170, 172 does not vent back through the molecular sieve beds 22, 23.

As depicted schematically in FIGS. 1 and 3, the dryer beds 170, 172 are separate from the drive cylinder 44. However, in either embodiment depicted in FIGS. 1 and 3, the dryer beds can be incorporated into the drive cylinder 44 and more specifically into the drive cylinder housing 144 as depicted in FIGS. 4A–4C and 5 and discussed in detail below.

As depicted in FIG. 1, the drive cylinder 44 has a central housing 144 and two end plates 146, 148. The central housing 144 is cylindrical and is mounted at opposite ends to the drive caps 146, 148.

Turning now to FIGS. 4A–4C, the dryer beds 80, 90 from FIG. 1 or 3 embodiments 170, 172 can be incorporated into the central housing 144 of the drive cylinder 44. For example, as depicted in FIGS. 4A–4C, dryer beds 80, 90 or 170, 172 can be co-extensive with the overall length of the central housing 144 by forming hollow sections 402, 404 on the outer periphery of the drive cylinder 144. These hollow sections can then be filled with the activated alumina material 426. Tube fittings 406, 408, 410, 412 are located at opposite ends of the hollow cylinders 402, 404 and serve to keep the activated alumina in the hollow cylinders 402, 404. Each bed includes a filter 420, a perforated plate 422 and a spring 424, such as a wave spring, at opposite ends of the hollow sections. The filter 420, perforated plate 422 and the spring 424 serve to retain the activated alumina 426. Advantageously, by having the dryer beds incorporated into the drive cylinder, space is utilized effectively. This advantageously eliminates extra components and minimizes weight, size and costs.

Refer now to FIG. 5 where one of the dryer beds 80, 90; 170, 172 is incorporated into an end cap 146. The end cap 146 can be modified to include a hollow portion 502 which is located radially outwardly from the center line of the end cap 146. The hollow portion 502 is in communication with the inner volume of the drive cylinder 44 so that the air flowing through the bed is dried before reaching the inner volume of the drive cylinder 44. The bed assembly includes a screen 510 made of a mesh screen material and a filter 512 for preventing particulates from entering the inner volume. At an opposite end of the hollow cylinder is another screen 514 and a filter 516. A wave spring 518 is located at the distal end of the hollow cylinder for compressing the activated alumina 520 which is centrally located between the screens 512, 514. A tube fitting is also located at the distal end for connection to an air line which is then connected to either a two-way valve 82, 92 or to the four-way valve 302.

It should now be apparent that a drying apparatus has been described which is useful for eliminating moisture from drive air for driving a pressure intensifier.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What claimed is:

1. A method of drying gas used in a pneumatically driven pressure intensifier, the pressure intensifier having pistons and used in a pressure swing adsorption system, the pressure swing adsorption system, including a pair of molecular sieve beds each connected to a first and a second valve, respectively, the first and the second valves each connected to a source of pressurized gas, the method comprising flowing pressurized gas to opposite sides of the pressure intensifier to position the pressure intensifier pistons;

flowing pressurized gas through a first activated bed to dry the gas and to pressurize one side of the pressure intensifier to shift the pressure intensifier to a first position and venting gas from the other side of the pressure intensifier through a second activated bed;

venting gas from the one side of the pressurized bed pressure intensifier through the first activated bed and flowing pressurized gas through the second activated bed to dry the gas and to pressurize the other side of the pressure intensifier to shift the pressure intensifier to a second position.

2. The method of claim 1, further comprising venting one of the pair of molecular sieve beds to atmosphere when the first valve is open and venting the other of said pair of molecular sieve beds to atmosphere when the second valve is open.

3. The method of claim 1, comprising flowing product gas from one of the molecular sieve beds when the first valve is open to a first one side of the pressure intensifier and flowing product gas from the other of the molecular sieve beds when the second valve is open to the first one side of the pressure intensifier.

4. The method of claim 1, comprising venting gas from one side of the pressure intensifier when one of the pair of molecular sieve beds is being vented and venting the other side of the pressure intensifier when the other of the pair of molecular sieve beds is being vented.

5. A drying apparatus for a pressure swing adsorption system including a pair of beds having molecular sieve material each having an inlet and an outlet and a pressure intensifier for increasing the pressure of an enriched product gas, and further including a pneumatic drive cylinder for the pressure intensifier having opposed sides which are alternatively pressurized in order to drive the pressure intensifier, the pair of beds and the pneumatic drive cylinder being coupled to a source of compressed feed air, said drying apparatus, comprising:

a pair of moisture removing beds each having one port connected to the source of compressed feed air and a second port connected to the pressure intensifier; and at least one valve means located between the source of compressed feed air and said pair of moisture removing beds;

wherein the pressure intensifier is alternatively pressurized with feed air via the pair of moisture removing beds.

6. The drying apparatus of claim 5, wherein said at least one valve means comprises a four-way valve.

7. The drying apparatus of claim 5, wherein said at least one valve means comprises a pair of two-way valves.

8. The drying apparatus of claim 5, wherein said pair of moisture removing beds include activated alumina.

9. The drying apparatus of claim 5, wherein each of said pair of moisture removing beds is formed from the pneumatic drive cylinder.

10. A pressure swing adsorption system having a pressure intensifier including a drying apparatus, comprising:

a pair of beds having molecular sieve material, each having an inlet and an outlet;

a pneumatic drive cylinder for the pressure intensifier having opposed sides which are alternatively pressurized in order to drive the pressure intensifier;

the pair of beds being disposed in the pneumatic drive cylinder and being coupled to a source of compressed feed air;

a pair of moisture removing beds each having one port connected to the source of compressed feed air and a second port connected to the pressure intensifier; and at least one valve means located between the source of compressed feed air and said pair of moisture removing beds;

wherein the pressure intensifier is alternatively pressurized with feed air via the pair of moisture removing beds.

11. The pressure swing adsorption system of claim 10, wherein said at least one valve means comprises a four-way valve.

12. The pressure swing adsorption system of claim 10, wherein said at least one valve means comprises a pair of two-way valves.

13. The pressure swing adsorption system of claim 10, wherein said pair of moisture removing beds includes activated alumina.

14. The pressure swing adsorption system of claim 10, wherein each of said pair of moisture removing beds is formed from the pneumatic drive cylinder.

15. A drying kit for retrofitting a pressure intensifier used in a pressure swing adsorption system, the pressure intensifier having a first side and a second side, the pressure swing adsorption system having a pair of molecular sieve beds and a first valve connected to a source of pressurized gas and to one of the pair of molecular sieve beds and a second valve connected to the source of pressurized gas and to the other of the pair of molecular sieve beds, said drying kit comprising:

a first activated bed connectable to the source of pressurized gas and to the first side of the pressure intensifier;

a second activated bed connectable to the source of pressurized gas and to the second side of the pressure intensifier; and means for at least one valve to selectively connect said first activated bed to the source of pressurized gas and for to selectively connect said second activated bed to the source of pressurized gas.

16. The drying kit of claim 15, wherein said means for selectively connecting is at least one valve comprises a four-way valve.

17. The drying kit of claim 15, wherein said means for selectively connecting is at least one valve comprises a pair of two-way valves.

18. The drying kit of claim 15, wherein said first and said second activated beds include activated alumina.

\* \* \* \* \*